United States Patent
Muller et al.

(10) Patent No.: US 9,091,465 B2
(45) Date of Patent: Jul. 28, 2015

(54) MAGNETOCALORIC HEAT GENERATOR

(75) Inventors: Christian Muller, Strasbourg (FR); Jean-Claude Heitzler, Horbourg-Wihr (FR); Alain-Francois Douarre, Gif sur Yvette (FR)

(73) Assignee: Cooltech Applications Societe par actions simplifiee, Holtzheim (FR)

( * ) Notice: Subject to any disclaimer, the term of this patent is extended or adjusted under 35 U.S.C. 154(b) by 142 days.

(21) Appl. No.: 13/255,583

(22) PCT Filed: Mar. 18, 2010

(86) PCT No.: PCT/FR2010/000228
§ 371 (c)(1),
(2), (4) Date: Sep. 9, 2011

(87) PCT Pub. No.: WO2010/106250
PCT Pub. Date: Sep. 23, 2010

(65) Prior Publication Data
US 2011/0315348 A1   Dec. 29, 2011

(30) Foreign Application Priority Data
Mar. 20, 2009 (FR) .................................... 09 51777

(51) Int. Cl.
*F25B 21/00* (2006.01)

(52) U.S. Cl.
CPC ........... *F25B 21/00* (2013.01); *F25B 2321/002* (2013.01); *Y02B 30/66* (2013.01)

(58) Field of Classification Search
CPC .................. F25B 2321/002; F25B 2321/0021; F25B 2321/0023; F25B 2321/00
USPC .................................................. 62/3.1, 324.2
See application file for complete search history.

(56) References Cited

U.S. PATENT DOCUMENTS

| | | | |
|---|---|---|---|
| 2,589,775 A * | 3/1952 | Constantin | 62/3.1 |
| 3,413,814 A | 12/1968 | Geuns | |
| 4,332,135 A | 6/1982 | Barclay et al. | |
| 4,507,928 A | 4/1985 | Johnson | |
| 5,357,756 A * | 10/1994 | Lubell | 62/3.1 |
| 6,684,941 B1 * | 2/2004 | Cao et al. | 165/104.25 |
| 7,481,064 B2 * | 1/2009 | Kitanovski et al. | 62/3.1 |
| 2006/0144048 A1 * | 7/2006 | Schulz | 60/641.8 |

(Continued)

FOREIGN PATENT DOCUMENTS

| | | |
|---|---|---|
| EP | 1 156 287 A1 | 11/2001 |
| EP | 1 736 717 A1 | 12/2006 |

(Continued)

*Primary Examiner* — Cheryl J Tyler
*Assistant Examiner* — Elizabeth Martin
(74) *Attorney, Agent, or Firm* — Davis & Bujold, P.L.L.C.; Michael J. Bujold

(57) ABSTRACT

A method for generating a heat flow from a magnetocaloric element (1) comprising at least one magnetocaloric material (2) comprising a hot end (3) associated with a hot chamber (4) and a cold end (5) associated with a cold chamber (6), the method comprises magnetically and alternately activating and de-activating the magnetocaloric element (1) and circulating a heat transfer fluid through the magnetocaloric element (1) alternately towards the hot chamber (4) and the cold chamber (5) in synchronisation with the magnetic activation and de-activation phases. This method is characterized in that the method comprises reversing the direction of circulation of the heat transfer fluid during the magnetic activation and de-activation phases and also relates to a magnetocaloric heat generator implementing the method.

10 Claims, 5 Drawing Sheets

(56) References Cited

U.S. PATENT DOCUMENTS

| | | | |
|---|---|---|---|
| 2007/0125095 A1* | 6/2007 | Iwasaki et al. | 62/3.1 |
| 2007/0220901 A1* | 9/2007 | Kobayashi et al. | 62/3.1 |
| 2009/0217675 A1* | 9/2009 | Kobayashi et al. | 62/3.1 |
| 2010/0000228 A1 | 1/2010 | Wiest et al. | |
| 2010/0095686 A1 | 4/2010 | Cramet et al. | |

FOREIGN PATENT DOCUMENTS

| | | |
|---|---|---|
| WO | 2008/064776 A1 | 6/2008 |
| WO | 2008/132342 A1 | 11/2008 |

* cited by examiner

Displacement of a drop of fluid along the regenerator (m)

- - - - Gradient T MMC Average
- ①  Gradient T MMC Not Activated Initial
- ③  Gradient T MMC Activated Initial
- ——— T Drop of water
- ②  Gradient T MMC Not Activated Final
- ④  Gradient T MMC Activated Final
- ⑤⑥ T MMC with respect to the drop of water

MAGNETOCALORIC HEAT GENERATOR

This application is a National Stage completion of PCT/FR2010/000228 filed Mar. 18, 2010, which claims priority from French patent application serial no. 09/51777 filed Mar. 20, 2009.

TECHNICAL SCOPE

The present invention relates to a method for generating a heat flow from a magnetocaloric element, said magnetocaloric element consisting of at least one magnetocaloric material comprising a hot end associated with a hot chamber and a cold end associated with a cold chamber, said method consisting in magnetically and alternately activating and de-activating the magnetocaloric element and in circulating a heat transfer fluid through said magnetocaloric element alternately towards the hot chamber and the cold chamber in synchronisation with the magnetic activation and de-activation phases.

It also relates to a magnetocaloric heat generator implementing said method.

PRIOR TECHNIQUE

The magnetocaloric heat generators operate according to the principle of the heat pump by withdrawing thermal energy from a so-called "cold" chamber or source and returning it, at a higher temperature, to a so-called "hot" chamber or source.

The magnetocaloric effect is an intrinsic property of the magnetocaloric materials. It causes a reversible variation of their temperature when they are subjected to a magnetic field or when they are removed from this magnetic field, or when this field is suppressed or substantially reduced. There are two types of magnetocaloric materials: the materials of the first type heat up by the effect of a magnetic field and cool down after removing this magnetic field and these of the second type, called "reverse magnetocaloric effect materials", cool down by the effect of a magnetic field and heat up when this magnetic field is removed.

To facilitate the comprehension of the present application, the expression "magnetically activated" shall be used to describe a magnetocaloric material that heats up, regardless of the presence or absence of a magnetic field. So, a magnetocaloric material of the first type will be magnetically activated when it will be subjected to a magnetic field and a reverse magnetocaloric effect material will be magnetically activated when it will be removed from this magnetic field. Likewise, a "magnetically de-activated" material is a material cooling down either because the magnetic field is suppressed in the case of the magnetocaloric materials of the first type, or because of the application of a magnetic field in the case of the reverse magnetocaloric effect materials.

The operating principle of the magnetocaloric effect—known under the name AMR (Active Magnetocaloric Refrigerator)—is illustrated in the attached FIGS. 1A to 1D. It consists in circulating a heat transfer fluid between the two hot and cold ends of a magnetocaloric material MC in synchronisation with the magnetic activation (by means of permanent magnets A—see FIGS. 1B and 1C) and the magnetic de-activation (see FIGS 1A and 1D) of said magnetocaloric material MC. The heat transfer fluid circulates towards the hot end during the magnetic activation of the material MC (FIGS. 1B and 1C), then towards the cold end during the magnetic de-activation of the material MC (FIGS. 1A and 1D). The displacement of the heat transfer fluid may be achieved by means of pistons P. The heat transfer fluid is intended for achieving a heat transfer with said magnetocaloric material MC and the two hot and cold ends are connected respectively to a hot chamber CH and to a cold chamber FR. The magnetocaloric material MC is porous or comprises passages that can be crossed by the heat transfer fluid, these passages connecting the volume of the cold chamber FR to the volume of the hot source CH, located on both sides of the magnetocaloric material MC. One considers that the temperature of the cold chamber is TFR, that the temperature of the hot chamber is TCH and that the length of the magnetocaloric material MC according to the direction of the passages is L. A temperature gradient is set up along the magnetocaloric material MC.

Of course, a heat generator using this operating principle of the magnetocaloric effect is intended for exchanging thermal energy with one or several external user circuits (heating, air conditioning, tempering, etc.), for example through a heat exchanger or not.

The publication U.S. Pat. No. 4,507,928 illustrates an example of an embodiment in which the magnetocaloric generator operates with helium, the superconductive magnets are fixed and the magnetocaloric materials are housed in a piston mobile in alternative translation between two extreme positions. The heat transfer fluid circulates in two separate fluid circuits controlled each by a piston pump. When the piston reaches the extreme position, the direction of circulation of the fluid is reversed. So, the change of the direction of circulation of the fluid and the change of the magnetic cycle coincide and are carried out simultaneously. This operating principle can be found in particular in the publications EP 1 156 287, U.S. Pat. No. 4,332,135 and WO 2008/132342.

There exists a need for improving the method of generating a heat flow. To that purpose, one considers that, for a given temperature amplitude between the hot and cold chambers and a given thermal power to be returned, the performance of a magnetocaloric heat generator is measured according to two essential criteria:

the coefficient of performance (COP), which is the ratio of the returned thermal energy related to the consumed mechanical or electrical energy (in particular for circulating the fluid and actuating the magnetic and/or hydraulic switching devices), and the volumic power density (in kW/l), which characterises the size of the heart of the generator, that is to say the size of the magnetocaloric element, referred to the produced thermal power.

There is in particular a demand for magnetocaloric heat generators liable to supply several kilowatts, and this more specifically for mobile applications having generally high compactness requirements, or for reversible heat pumps requiring a temperature amplitude higher than 80 K. Furthermore, such generators should offer a coefficient of performance COP higher than 3.

One can consider that, at each switching of the magnetic field (i. e. when switching from the magnetically activated to the magnetically de-activated status and vice-versa), the mass of magnetocaloric material receives alternately and instantaneously a stock of "calories" or "frigories" that it then returns to the fluid during the alternation initiated by said switching.

From this results that the main means for maximising the power returned for a given volume of magnetocaloric material is to increase the magnetic switching frequency, in order to benefit more often from the magnetocaloric effect (which is almost instantaneous).

However, increasing the switching frequency requires to increase accordingly the performance of the heat exchange between the material MC and the heat transfer fluid, thus, in practice, to multiply the exchange areas, while keeping the same global heat transfer fluid volume contained in the magnetocaloric material MC. This entails using a magnetocaloric material comprising many very thin fluid passages, or even micro-passages, or a porous magnetocaloric material.

Now, the power necessary for circulating the heat transfer fluid in the magnetocaloric material increases in accordance with the square of the ratio of the length of the magnetocaloric material to the hydraulic diameter of the fluid channels or passages. In addition, the conduction heat losses through the magnetocaloric material (parasitic conductive flow going from the hot face to the cold face of the magnetocaloric material) increase according to the reverse ratio of the square of the length of the magnetocaloric material. Since the circulation of the heat transfer fluid is the main power consumption source of a magnetocaloric heat generator, any degradation of this item directly affects the COP—at the denominator. It is known that the mechanical energy used for circulating the fluid furthermore contributes to the returned thermal power—at the numerator of the COP—, positively for the heating and negatively for the refrigeration. Regarding the conductive losses, these are deducted from the returned useful power, and they affect directly the COP at the numerator.

It results from the above that, at the present level of the technology of the magnetocaloric alloys and of the magnetisation systems, the identified means liable to allow a substantial increase of the power density also strongly reduce the COP, and that the judicious dimensioning of a magnetocaloric heat pump for a given application results from a compromise between its size and its energy efficiency.

DESCRIPTION OF THE INVENTION

The present invention aims to overcome the above-mentioned compromise by proposing a method that allows increasing the thermal power that passes in a magnetocaloric element, and thus the useful power of a magnetocaloric heat generator implementing this method, without loss of efficiency.

For this purpose, the invention relates to a method for generating a thermal flow of the kind defined in the preamble, characterized in that it consists in reverting the direction of circulation of the heat transfer fluid during said magnetic activation and de-activation phases, said magnetic activation phase comprising an initial step during which the heat transfer fluid circulates in the opposite direction towards the cold chamber, followed by a preponderant step during which the heat transfer fluid circulates in the good direction towards the hot chamber, and said magnetic de-activation phase comprising an initial step during which the heat transfer fluid circulates in the opposite direction towards the hot chamber, followed by a preponderant step during which the heat transfer fluid circulates in the good direction towards the cold chamber.

The method according to the invention thus implements a particular coupling between the magnetocaloric cycle and the oscillation of the fluid which, due to its specific characteristics, maximises the active "raising" heat flow in the above conditions, improving substantially the returned power (to reach a power density of the order of 0.5 to 1 kW/l).

For the applications requiring compactness, the internal losses linked with the frequency increase may be limited by reducing the length of the regenerator formed by the magnetocaloric element and even more the amplitude of oscillation of the heat transfer fluid passing through it in order to limit the fluidic head losses. It is thus suggested to circulate through the magnetocaloric element, at each magnetic alternation, a quantity of heat transfer fluid smaller than the quantity of fluid liable to be contained in said magnetocaloric element, so that a part of the heat transfer fluid contained in the magnetocaloric element is not renewed. The renewal rate of the heat transfer fluid in the magnetocaloric element is then lower than one.

Preferably, the method can so consist in circulating alternately, in one direction, and then in the other, a quantity of heat transfer fluid smaller than the quantity of heat transfer fluid that could be contained in said magnetocaloric element.

Furthermore, the method may consist in determining a duration of the initial step of the magnetic activation and de-activation phases shorter than half of the duration of each of said magnetic activation and de-activation phases.

The invention also relates to a magnetocaloric heat generator comprising at least one magnetocaloric element made of at least one magnetocaloric material comprising a hot end associated with a hot chamber and a cold end associated with a cold chamber, a means of magnetic activation and de-activation of said magnetocaloric material and means of circulation driving a heat transfer fluid through said magnetocaloric element alternately towards the hot chamber and the cold chamber in synchronisation with the magnetic activation and de-activation phases. This magnetocaloric heat generator is characterised in that it comprises a control unit for said heat transfer fluid circulation means arranged to reverse its direction of circulation during said magnetic activation and de-activation phases according to the method.

BRIEF DESCRIPTION OF THE DRAWINGS

The present invention and its advantages will be better revealed in the following description of an embodiment given as a non limiting example, in reference to the drawings in appendix, in which.

ILLUSTRATIONS OF THE INVENTION

Figure 1A:
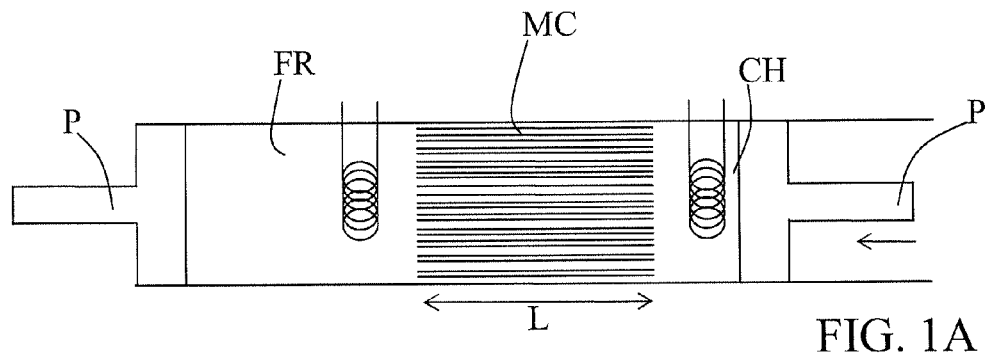
FIGS. 1A to 1D represent schematically a magnetocaloric element in its different operating steps according to the known heat flow generation method.

FIGS. 2A to 2E represent schematically an elevation view of a magnetocaloric element 1 made up of one or several magnetocaloric materials 2, for example made of superposed plates whose spacing defines circulation channels for the heat transfer fluid which is driven by means of circulation or circulator 8. This magnetocaloric element 1 is crossed by a heat transfer fluid (according to the arrows) in synchronisation with the magnetic activation and de-activation phases of this magnetocaloric element 1. These magnetic activation and de-activation phases are achieved with the help of a means 7 of magnetic activation and de-activation represented in the attached example as a permanent magnet in relative movement with respect to the magnetocaloric element. Of course, the invention is not limited to the use of permanent magnets. Any other device liable to produce a magnetic field may be used, such as for example a sequentially powered electromagnet.

In order to facilitate the heat exchanges with the heat transfer fluid, said magnetocaloric element 1 may be porous, so that its pores form open fluid passages. It may also be made in the form of a full block in which mini or micro channels are machined or it may be made up of an assembly of possibly grooved superposed plates, between which the heat transfer fluid can flow. This configuration corresponds to the represented one. Any other embodiment allowing the heat transfer fluid to pass through said magnetocaloric material 1 can, of course, be suitable.

Figure 1B:
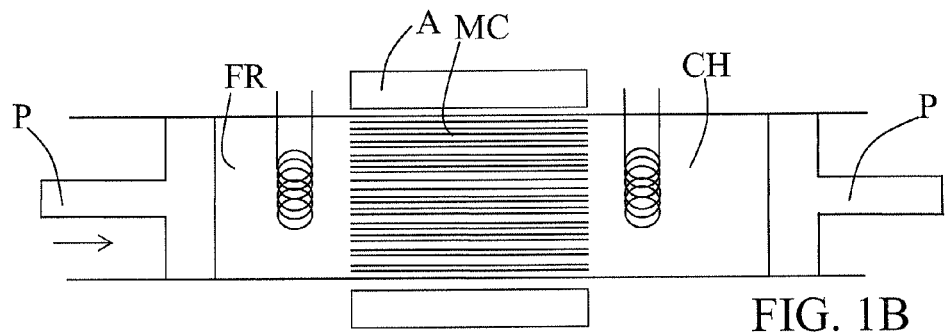
Figure 1C:
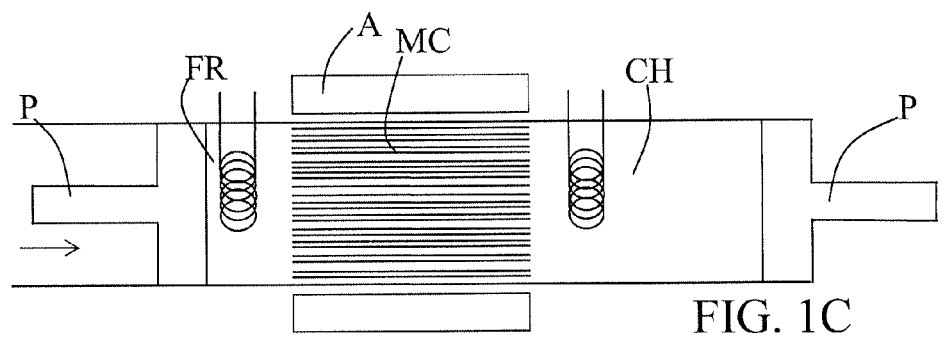
Figure 1D:
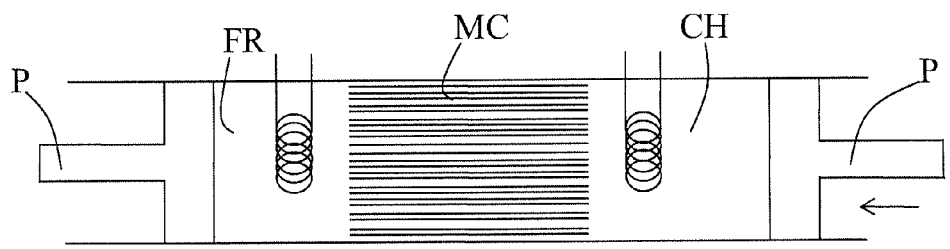

The method according to the invention consists in circulating heat transfer fluid alternately towards the cold chamber 6, then towards the hot chamber 4. This heat transfer fluid circulation is synchronised in a new way with respect to the magnetic activation and de-activation phases. In fact, in the known methods (see FIG. 1A-D), the heat transfer fluid is circulated towards the hot chamber 4 when the magnetocaloric element 1 is magnetically activated (and heats up)—see FIGS. 1B and 1C—and towards the cold chamber 6 when the magnetocaloric element 1 is magnetically de-activated (and cools down)—see FIGS. 1A and 1D. The method according to the invention provides to impose a phase or time shift between the change of direction of circulation of the heat transfer fluid and the change of status (magnetically activated or de-activated) of the magnetocaloric element 1.

Preferably, and as represented in FIGS. 2A to 2E and 3A, this phase shift leads to a delay in the change of direction of circulation of the heat transfer fluid with respect to the change of magnetic status of the magnetocaloric element.

Figure 2A:
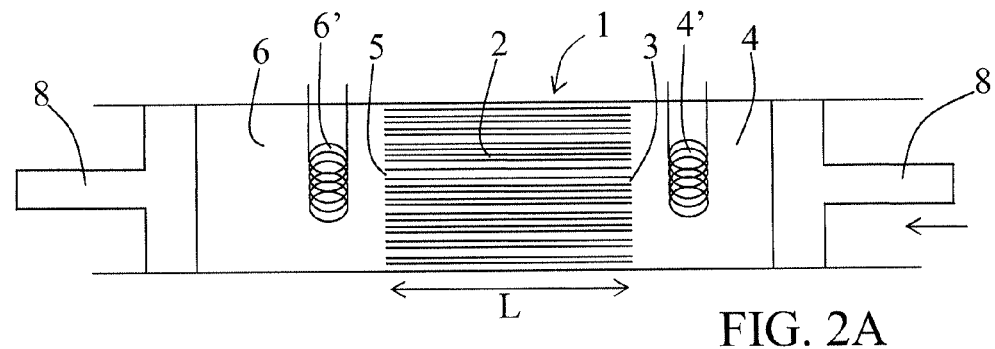
FIGS. 2A to 2E represent schematically a magnetocaloric element in its different operating steps according to the method of the invention.
Figure 2B:
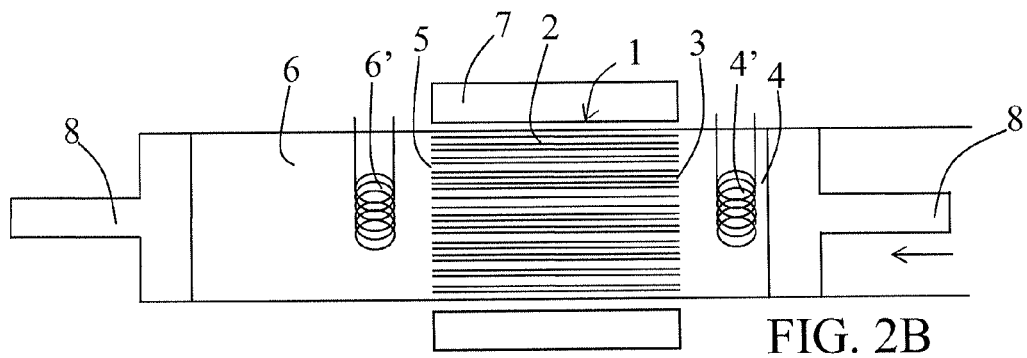
Figure 2C:
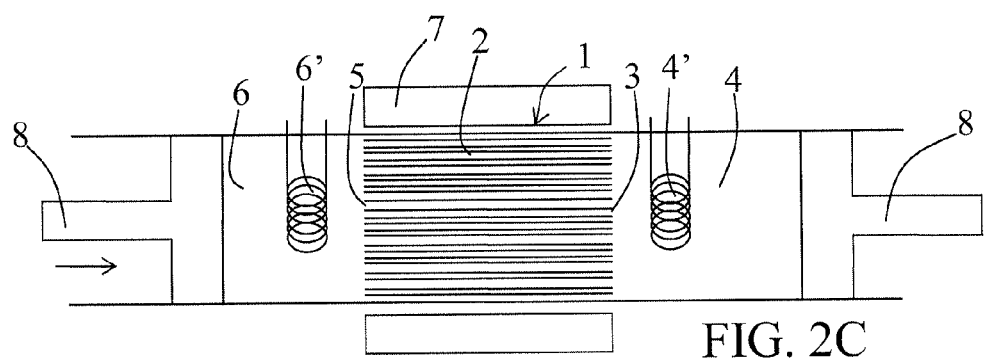
Figure 2D:
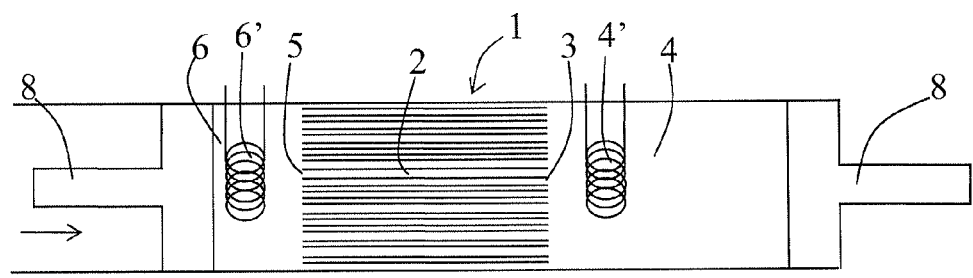

This shift is represented more specifically in FIGS. 2B and 2D. FIG. 2B represents the situation in which the heat transfer fluid still moves towards the cold chamber 6 while the cycle change already took place, so while the material is magnetically activated and heats up. FIG. 2D represents the opposite situation in which the fluid still is moving towards the hot chamber 4 while the cycle change already took place, so while the material is magnetically de-activated and cools down.

Figure 2E:
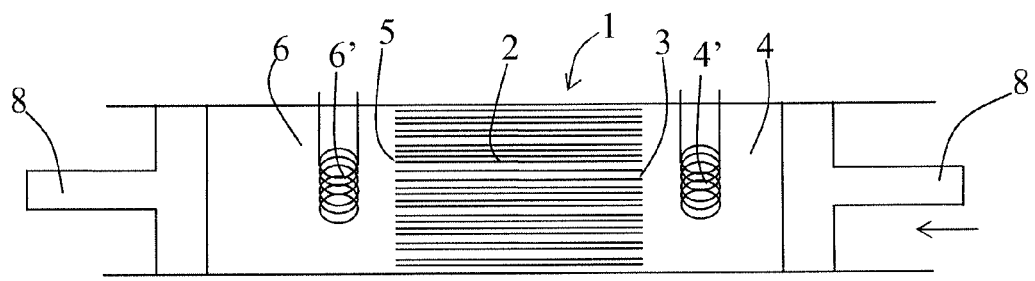

So, two directions of circulation of the heat transfer fluid are associated to the magnetic activation phase. In a first stage (initial phase), this heat transfer fluid maintains its direction of circulation towards the cold chamber 6 (FIG. 2B) while the magnetocaloric element 1 has been meanwhile magnetically activated, then it circulates towards the hot chamber 4, while the magnetocaloric element 1 remains magnetically activated (FIG. 2C). Then the magnetic de-activation phase of the magnetocaloric element 1 takes place, in which the heat transfer fluid also maintains, at the beginning (initial phase), the direction of circulation towards the hot chamber 4 (FIG. 2D) before changing its direction of circulation, while the magnetocaloric element 1 remains magnetically de-activated (FIG. 2E).

In other words, the magnetic activation phase comprises an initial step during which the heat transfer fluid circulates in the opposite direction towards the cold chamber 6 and a preponderant step during which the heat transfer fluid circulates in the good, or normal direction towards the hot chamber 4, and the magnetic de-activation phase comprises an initial step during which the heat transfer fluid circulates in the opposite direction towards the hot chamber 4 and a preponderant step during which the heat transfer fluid circulates in the good, or normal direction towards the cold chamber 6.

Figure 3A:
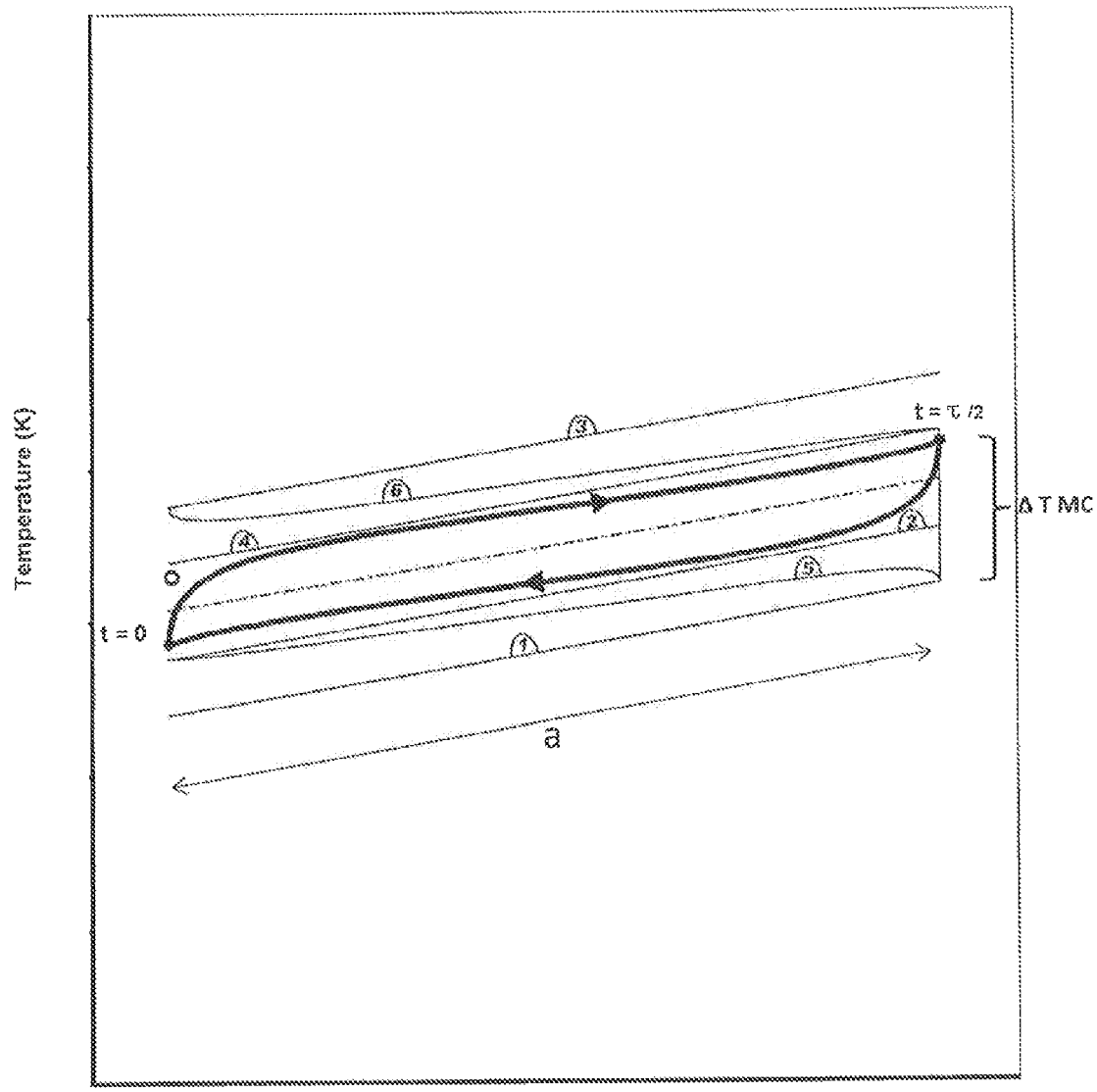
FIG. 3A is a diagram illustrating the evolution of the temperature of a drop of heat transfer fluid circulating in the magnetocaloric element of FIGS. 1A to 1D.
Figure 3B:
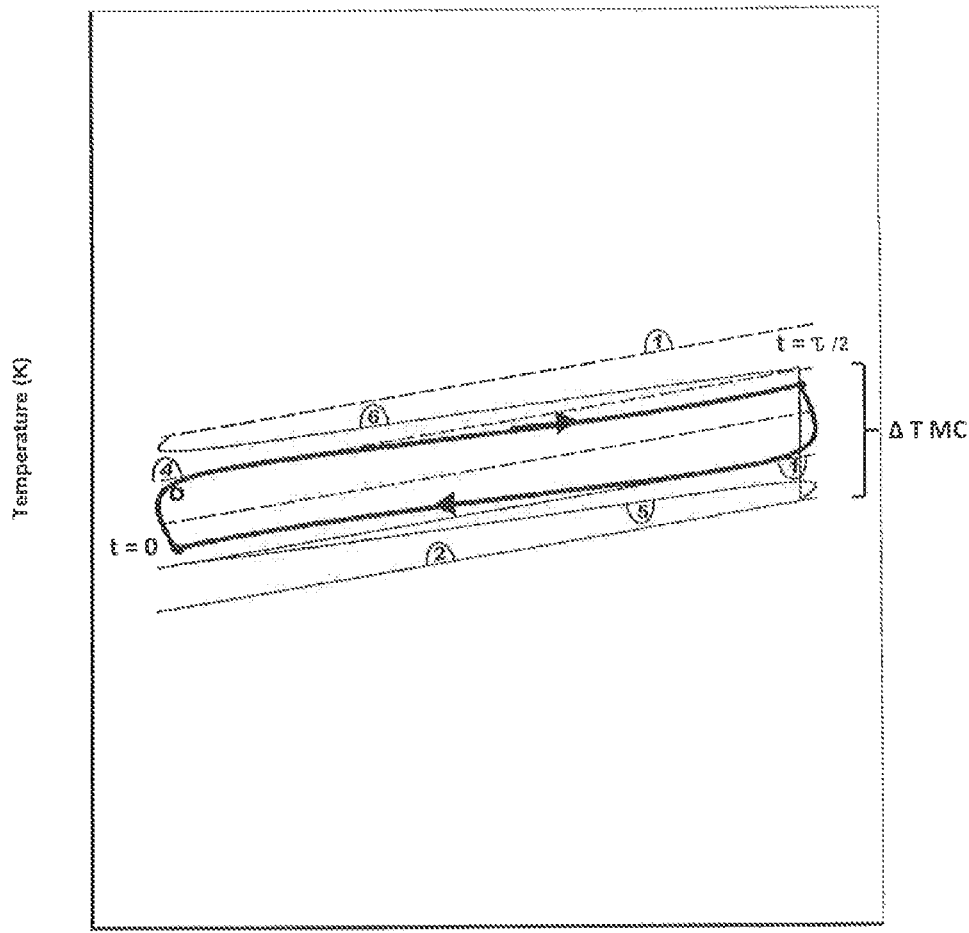
FIG. 3B is a diagram similar to that of FIG. 3A relating to the method of the invention implemented in the magnetocaloric element of FIGS. 2A to 2E.

As shown by the diagram of FIG. 3B, this new method allows increasing significantly the area delimited by the closed curve representing the path of a drop of heat transfer fluid with respect to that of FIG. 3A, which is representative of the active heat flow and thus of the thermal power of the generator implementing such a method according to the invention. The diagrams of FIGS. 3A and 3B describe in fact the displacement of a drop of heat transfer fluid inside of one of the passages of the magnetocaloric element respectively according to the known method of FIGS. 1A to 1D and according to the method of the invention represented by FIGS. 2A to 2E.

The displacement of a drop of fluid, representative of the formation of the active flow, is described hereafter with respect to the method of FIGS. 1A to 1D. The diagram of FIG. 3A illustrates the mechanism of the formation of the active heat flow raising the temperature gradient set up in the generator between the cold chamber FR and the hot chamber CH. In the diagram, the abscissa axis represents the distance x according to the length L of the magnetocaloric material or element MC and the ordinate axis represents the temperature. The cold source or chamber FR is located on the left of abscissa 0 and the hot source CH is located on the right of abscissa L. The heat transfer fluid is subjected to an oscillating linear movement of period $\tau$, and thus changes direction at every half period. The amplitude of the oscillation, equal to the distance covered in each direction, is smaller than the length L of the magnetocaloric material MC, so that the abscissa axis represented in this diagram does not cover the whole length L of the magnetocaloric material MC.

One notes that:

At the moment $t=0$, the magnetocaloric material MC is activated. The position of the drop of heat transfer fluid in said material MC is shown by a first point, on the left of the diagram. It is at this time located at its minimum abscissa. The oriented curve that starts from the point represents the evolution of the temperature of the drop of fluid during its displacement in said material MC, until it returns at its starting point at time $t=\tau$.

Between $t=0$ and $t=\tau/2$, the magnetocaloric material remains activated and transfers heat to the drop of heat transfer fluid. The temperature of the magnetocaloric material (T MMC) along the path of the drop of fluid follows the temperature gradient set up between the two hot and cold sources. It is represented by the straight line "Gradient T MMC Activated Initial".

At $t=\tau/2$, the temperature of the magnetocaloric material along the path of the drop of fluid decreases because of the heat it transferred to the latter. It is represented by the straight line "Gradient T MMC Activated Final".

The curve "T MMC with respect to the drop of water" represents the temperature of the magnetocaloric material with respect to the drop of fluid. From $t=0$ to $t=\tau/2$, it links naturally the two previous straight lines, joining the first on the left of the diagram at $t=0$, at the vertical of the minimum of the path of the drop, and the second on the right of the diagram at $=\tau/2$, at the vertical of the maximum of said path, shown by the second point.

At $t=\tau/2$, the magnetocaloric material is magnetically de-activated. Its temperature decreases instantly by $\Delta TMC$, according to the gradient set up between the cold source and the hot source. It is represented by the straight line "Gradient T MMC Not Activated Initial", parallel to the previous ones. It is now lower than that of the heat transfer fluid, so that the magnetocaloric material receives heat from the fluid up to $\tau$. The drop of fluid is made to circulate in the opposite direction.

At $\tau$, the temperature of the magnetocaloric material increases again because of the heat it took from it. It is represented by the straight line "Gradient T MMC Not Activated Final", still parallel to the previous ones. As previously, the curve "T MMC with respect to the drop of fluid" links both straight lines, joining the first at t=τ/2, on the right of the diagram, at the vertical of the maximum of the path of the drop, and the second at t=τ, on the left of the diagram, at the vertical of the minimum of said path.

The magnetocaloric material is then re-activated, regaining ΔTMC, which restores the initial configuration of the cycle, at t=0.

During the first half period, the magnetocaloric material has cooled down by ΔTMMC, represented by the distance between the two curves "Gradient T MMC Activated Initial" and "Gradient T MMC Activated Final", while the drop of heat transfer fluid circulating in the passage facing it has been renewed and is now at a temperature above that of the initial drop of fluid, always according to the gradient of the generator.

To lighten the diagram, the profile of the temperature of the heat transfer fluid along the passage is not represented. At t=0, it would be represented by a straight line parallel to the gradient passing through the first point, and at t=τ/2, by a parallel straight line passing through the second point, but also through the small circle which shows, on the left of the diagram, another drop of fluid coming from the left and arriving at the starting abscissa of the first drop at τ/2. The distance between the first point and the small circle thus measures the variation of the temperature of the fluid with respect to the material during the half period.

The second half period naturally shows the reverse variations.

The active heat flow that "raises" the gradient (or thermal power, which crosses from left to right the cross-section of the material MC defined by a passage and the half wall surrounding it, divided by the area of said cross-section) may be assessed by comparing the energies exchanged on the left and on the right of the centre of symmetry of said closed curve. In the first half period, the temperature differences between the drop of fluid and the magnetocaloric material MC are larger on the left than on the right. Consequently, the drop of fluid receives more energy from the material MC on the left than on the right. In the second half period, the symmetrical temperature differences are larger on the right than on the left. When it returns, the drop of fluid gives more energy to the material MC on the right than on the left. The difference of energy exchanged between the left section and the right section of the path is identical, in absolute terms, during both half periods. Finally, everything results in the fact that the drop of fluid takes from the material MC this difference of energy in the left section of its path, and returns it to it in the right section. Of course, during the following cycle, another drop of fluid located more on the right will take over the energy returned by the first and will carry it slightly farther. This way the thermal energy progresses along the magnetocaloric material MC, "raising" the temperature gradient.

The applicants identified in a new way that the thermal energy of the drop of fluid is proportional to its temperature, in relation to its thermal capacity. So, the average energy transported by a drop of fluid during its path from the minimum abscissa to the maximum abscissa of its oscillation—counted positively—is proportional to the area subtended by the curve representing the temperature of the drop during this path up to the horizontal abscissa axis, referred to distance "a". Likewise, the average energy it transports in its return path from the maximum abscissa to the minimum abscissa of its oscillation—counted negatively—is proportional to the area subtended by the curve representing the temperature of the drop during this path up to the horizontal abscissa axis, still referred to distance "a". So, the energy displaced from "a" towards the hot source during the complete cycle is proportional to the difference of both areas, always referred to distance "a". Dividing by the period τ and multiplying by the thermal capacity of the fluid contained in the regenerator, one obtains the power flow travelling from the cold source to the hot source. Finally, the power flow through the regenerator or magnetocaloric element is proportional to the area of the closed path of the drop in the plane of the diagram referred to distance "a". It is positive—towards the hot source—if the drop describes the path clockwise, negative otherwise.

Thanks to the invention, by achieving a phase shift between the change of the magnetic activation phase and the change of the circulation direction of the heat transfer fluid, the area of the closed path of the drop is increased, for the same quantity of magnetocaloric material, which leads to an increase of the thermal power of a heat generator implementing the method according to the invention.

The duration of the phase shift, which corresponds to the duration of the initial steps described above, shall be chosen in function of the heat exchange coefficient between the magnetocaloric element 1 and the heat transfer fluid. The higher this coefficient, the faster the temperature of the fluid reaches that of the magnetocaloric material after the magnetic alternation, and the smaller this phase shift can be, and conversely.

In the case of a method using a renewal rate smaller than one, the duration of the initial step of the magnetic activation and de-activation phases can be shorter than half the duration of each of the magnetic activation and de-activation phases.

We can notice that the recommended delay for the heat transfer fluid has no relation with a possible activation delay for the magnetocaloric material as from the magnetic alternation. We consider here that the increase of the temperature of the magnetocaloric material is instantaneous. If such an activation delay was to be taken into consideration, for example for certain material types or for high cycle frequencies, it would be added to the previous phase shift.

FIGS. 2A to 2E represent the heat generator according to the invention. It is of course intended for exchanging thermal energy with one or more external user circuits (heating, air conditioning, tempering, etc.) connected with at least one hot 4 or cold 5 chamber, possibly by means of a heat exchanger 4', 6' that may be integrated in each hot 4 or cold 5 chamber.

Possibilities for Industrial Application:

This description shows clearly that the invention allows reaching the goals defined, that is to say to offer a method that allows increasing the thermal power of a magnetocaloric element and the efficiency of a magnetocaloric heat generator implementing this method.

The method and the heat generator according to the invention can find an application, as well industrial as domestic, in the area of heating, air conditioning, tempering, cooling or others, at competitive costs and with reduced space requirements.

The present invention is not restricted to the example of embodiment described, but extends to any modification or variant which is obvious to a person skilled in the art while remaining within the scope of the protection defined in the attached claims.

The invention claimed is:

1. A method of generating a heat flow from a magnetocaloric element (1), the magnetocaloric element (1) comprising at least one magnetocaloric material (2) comprising a hot end (3) associated with a hot chamber (4) and a cold end (5) associated with a cold chamber (6), the method comprising magnetically and alternately activating and de-activating the magnetocaloric element (1) and circulating a heat transfer fluid through the magnetocaloric element (1) alternately towards the hot chamber (4) and the cold chamber (5) in synchronisation with magnetic activation and de-activation phases, the method comprising the steps of:

reversing a direction of circulation of the heat transfer fluid during the magnetic activation and de-activation phases, activating the magnetocaloric element (1) to commence the magnetic activation phase during which the heat transfer fluid, during an initial step, circulates in a direction towards the cold chamber (6), followed by a principal step during which the heat transfer fluid subsequently reverses direction and circulates in a direction toward the hot chamber (4) prior to commencement of the succeeding magnetic de-activation phase, and de-activating the magnetocaloric element (1) to commence the magnetic de-activation phase during which the heat transfer fluid, during an initial step, continues to circulate in the direction toward the hot chamber (4), followed by a principal step during which the heat transfer fluid subsequently reverses direction and circulates in the direction towards the cold chamber (6) prior to commencement of the succeeding magnetic activation phase.

2. The method according to claim 1, further comprising the step of alternately circulating, in a first direction and then in an opposite second direction, a quantity of heat transfer fluid smaller than a quantity of heat transfer fluid that could be contained within the magnetocaloric element (1).

3. The method according to claim 1, further comprising the step of determining a duration of the initial step of the magnetic activation and the de-activation phases, where the duration of the initial step of the magnetic activation and de-activation phases is shorter than half of an entire duration of each of the magnetic activation and de-activation phases.

4. The method according to claim 1, further comprising the steps of:

reversing the direction of circulation of the heat transfer fluid from the cold chamber toward the hot chamber at a time point after commencement of the magnetic activation phase and prior to commencement of the magnetic de-activation phase; and reversing the direction of circulation of the heat transfer fluid from the hot chamber toward the cold chamber at a time point after commencement of the magnetic de-activation phase and prior to commencement of the magnetic activation phase.

5. A magnetocaloric heat generator comprising at least one magnetocaloric element (1) made of at least one magnetocaloric material (2) comprising a hot end (3) associated with a hot chamber (4) and a cold end (5) associated with a cold chamber (6), a magnetic activator (7) of the magnetocaloric material (1) and a circulator (8) driving a heat transfer fluid through the magnetocaloric element (1) alternately towards the hot chamber and the cold chamber in synchronisation with magnetic activation and de-activation phases, wherein the magnetocaloric heat generator comprises a control unit for the circulator of the heat transfer fluid arranged to reverse a circulation direction of the heat transfer fluid during the magnetic activation and de-activation phases according to a method comprising the steps of:

reversing the direction of circulation of the heat transfer fluid during the magnetic activation and de-activation phases, activating the magnetocaloric element (1) to commence the magnetic activation phase that comprises an initial step during which the heat transfer fluid circulates in a direction towards the cold chamber (6), followed by a principal step during which the heat transfer fluid subsequently reverses direction and circulates in a direction toward the hot chamber (4) prior to commencement of the succeeding magnetic de-activation phase, and de-activating the magnetocaloric element (1) following conclusion of the preceding principal step of the magnetic activation phase to commence the magnetic de-activation phase comprising an initial step during which the heat transfer fluid continues to circulate in the direction toward the hot chamber (4), followed by a principal step during which the heat transfer fluid subsequently reverses direction and circulates in the direction towards the cold chamber (6) prior to commencement of the succeeding magnetic activation phase.

6. The magnetocaloric heat generator according to claim 5, wherein the control unit reverses the direction of circulation of the heat transfer fluid from the cold chamber toward the hot chamber at a time point after commencement of the magnetic activation phase and prior to commencement of the magnetic de-activation phase; and the control unit reverses the direction of circulation of the heat transfer fluid from the hot chamber toward the cold chamber at a time point after commencement of the magnetic de-activation phase and prior to commencement of the magnetic activation phase.

7. A method of generating a heat flow from a magnetocaloric element (1), the magnetocaloric element (1) comprising at least one magnetocaloric material (2), the magnetocaloric element being selectively activatable and de-activatable, the method comprising the steps of:

concurrently initiating a magnetic activation phase, by magnetically activating the magnetocaloric element (1), and circulating a heat transfer fluid, through the magnetocaloric element (1), in a first direction;

reversing circulation of the heat transfer fluid and circulating the heat transfer fluid through the magnetocaloric element in a second direction during the magnetic activation phase subsequent to the initiation of the magnetic activation phase;

concurrently initiating a magnetic de-activation phase, by magnetically de-activating the magnetocaloric element, and circulating the heat transfer fluid in the second direction;

reversing circulation of the heat transfer fluid and circulating the heat transfer fluid through the magnetocaloric element in the first direction during the magnetic de-activation phase subsequent to the initiation of the magnetic de-activation phase; and repeating the steps of initiating the magnetic activation phase and circulating the heat transfer fluid in the first direction, reversing circulation of the heat transfer fluid and circulating the heat transfer fluid in the second direction, initiating the magnetic de-activation phase and circulating the heat transfer fluid in the second direction, and reversing circulation of the heat transfer fluid and circulating the heat transfer fluid in the first direction so as to generate the heat flow.

8. The method according to claim 7, further comprising the steps of:

maintaining circulation of the heat transfer fluid in the second direction towards a hot chamber of the magnetocaloric element during a shorter duration than the magnetic activation phase following a switch from the magnetic activation phase to the magnetic de-activation phase; and maintaining circulation of the heat transfer fluid in the first direction towards a cold chamber of the magnetocaloric element during a shorter duration than the magnetic deactivation phase following a switch from the magnetic de-activation phase to the magnetic activation phase.

9. The method according to claim 7, further comprising the steps of:
   continually circulating the heat transfer fluid in the first direction from a time point prior to initiation of the magnetic activation phase to a time point after initiation of the magnetic activation phase; and
   continually circulating the heat transfer fluid in the second direction from a time point prior to initiation of the magnetic deactivation phase to a time point after initiation of the magnetic deactivation phase.

10. A method of generating a heat flow from a magnetocaloric element (1), the magnetocaloric element (1) comprising at least one magnetocaloric material (2), the magnetocaloric element being selectively activatable and de-activatable, the method comprising the steps of:
   concurrently initiating a magnetic activation phase, by magnetically activating the magnetocaloric element (1), and circulating a heat transfer fluid, through the magnetocaloric element (1), in a first direction;
   reversing circulation of the heat transfer fluid and circulating the heat transfer fluid through the magnetocaloric element in a second direction during the magnetic activation phase subsequent to the initiation of the magnetic activation phase;
   concurrently initiating a magnetic de-activation phase, by magnetically de-activating the magnetocaloric element, and circulating the heat transfer fluid in the second direction;
   reversing circulation of the heat transfer fluid and circulating the heat transfer fluid through the magnetocaloric element in the first direction during the magnetic de-activation phase subsequent to the initiation of the magnetic de-activation phase; and
   repeating the steps of initiating the magnetic activation phase and circulating the heat transfer fluid in the first direction, reversing circulation of the heat transfer fluid and circulating the heat transfer fluid in the second direction, initiating the magnetic de-activation phase and circulating the heat transfer fluid in the second direction, and reversing circulation of the heat transfer fluid and circulating the heat transfer fluid in the first direction so as to generate the heat flow;
   maintaining circulation of the heat transfer fluid in the second direction towards a hot chamber of the magnetocaloric element for a portion of the magnetic deactivation phase following a switch from the magnetic activation phase to the magnetic de-activation phase;
   maintaining circulation of the heat transfer fluid in the first direction towards a cold chamber of the magnetocaloric element for a portion of the magnetic activation phase following a switch from the magnetic de-activation phase to the magnetic activation phase;
   reversing circulation of the heat transfer fluid from the cold chamber toward the hot chamber at a time point after initiating the magnetic activation phase and prior to initiating the magnetic de-activation phase; and
   reversing circulation of the heat transfer fluid from the hot chamber toward the cold chamber at a time point after initiating the magnetic de-activation phase and prior to initiating the magnetic activation phase.

* * * * *